United States Patent
Byun et al.

(10) Patent No.: US 8,974,953 B2
(45) Date of Patent: Mar. 10, 2015

(54) RECHARGEABLE BATTERY WITH A SHORT CIRCUIT PLATE

(75) Inventors: Sangwon Byun, Yongin-si (KR); Sooseok Choi, Yongin-si (KR); Sungbae Kim, Yongin-si (KR)

(73) Assignees: Samsung SDI Co., Ltd., Yongin-si (KR); Robert Bosch GmbH, Stuttgart (DE)

( * ) Notice: Subject to any disclaimer, the term of this patent is extended or adjusted under 35 U.S.C. 154(b) by 273 days.

(21) Appl. No.: 12/816,805

(22) Filed: Jun. 16, 2010

(65) Prior Publication Data
US 2011/0183198 A1 Jul. 28, 2011

(30) Foreign Application Priority Data
Jan. 26, 2010 (KR) .................. 10-2010-0007046

(51) Int. Cl.
*H01M 2/04* (2006.01)
*H01M 2/08* (2006.01)
*H01M 2/34* (2006.01)
*H01M 10/052* (2010.01)

(52) U.S. Cl.
CPC .............. *H01M 2/08* (2013.01); *H01M 2/0456* (2013.01); *H01M 2/345* (2013.01); *H01M 10/052* (2013.01); *Y02T 10/7011* (2013.01)
USPC .............. 429/175; 429/61; 429/178; 429/179

(58) Field of Classification Search
USPC .................................... 429/61, 175, 178, 179
See application file for complete search history.

(56) References Cited

U.S. PATENT DOCUMENTS

| | | | | |
|---|---|---|---|---|
| 4,966,822 | A * | 10/1990 | Johnston | 429/62 |
| 5,327,089 | A * | 7/1994 | Ouellette | 324/345 |
| 6,342,826 | B1 * | 1/2002 | Quinn et al. | 337/300 |
| 7,294,433 | B2 * | 11/2007 | Murashige et al. | 429/180 |
| 2009/0317665 | A1 | 12/2009 | Maeng et al. | |

FOREIGN PATENT DOCUMENTS

| | | | |
|---|---|---|---|
| JP | 08124554 A | * | 5/1996 |
| KR | 10-2009-0132926 A | | 12/2009 |

OTHER PUBLICATIONS

KIPO Notice of Allowance dated Nov. 14, 2011 in priority Korean application 10-2010-0007046, 5 pages.

* cited by examiner

*Primary Examiner* — Gregg Cantelmo
(74) *Attorney, Agent, or Firm* — Christie, Parker & Hale, LLP

(57) ABSTRACT

A rechargeable battery includes an electrode assembly including a first electrode plate, a second electrode plate, and a separator between the first electrode plate and the second electrode plate; a case housing the electrode assembly; and a cap assembly coupled to the case, wherein the cap assembly includes a cap plate sealing the case and having a short circuit opening; a first short circuit plate installed at the short circuit opening of the cap plate; a second short circuit plate on an exterior of the cap plate and spaced from the cap plate to cover the short circuit opening; and a sealing layer between the second short circuit plate and the cap plate.

12 Claims, 4 Drawing Sheets

US 8,974,953 B2

RECHARGEABLE BATTERY WITH A SHORT CIRCUIT PLATE

CROSS-REFERENCE TO RELATED APPLICATION

This application claims priority to and the benefit of Korean Patent Application No. 10-2010-0007046, filed Jan. 26, 2010, in the Korean Intellectual Property Office, the disclosure of which is incorporated by reference herein in its entirety.

BACKGROUND

1. Field

Embodiments relate to a rechargeable battery.

2. Description of the Related Art

Unlike a primary battery that is not rechargeable, a rechargeable battery is dischargeable and rechargeable. A low capacity battery having a battery cell packaged in the form of a pack is generally used for a small, portable electronic device such as a mobile phone and a camcorder. A large capacity battery having tens of battery packs interconnected is often used as a power source for driving a motor of a hybrid vehicle and the like.

The rechargeable battery is formed in a variety of shapes such as a prismatic shape, a cylinder shape, and the like. The rechargeable battery typically includes an electrode assembly having positive and negative electrode plates and a separator between the positive and negative electrode plate, a case accommodating the electrode assembly as well as electrolyte, and a cap assembly having electrode terminals and installed on the case.

A short circuit due to condensed water within the case may accelerate degradation of a rechargeable battery, and may reduce its capacity. In addition, condensed water may corrode inner components of a rechargeable battery.

SUMMARY

An aspect of the present invention provides a rechargeable battery that prevents or reduces the likelihood of a short circuit due to condensed water to prevent degradation and capacity decrease and to prevent corrosion of inner components due to condensed water.

According to at least one embodiment, a rechargeable battery is provided including an electrode assembly including a first electrode plate, a second electrode plate, and a separator between the first electrode plate and the second electrode plate; a case housing the electrode assembly; and a cap assembly coupled to the case, wherein the cap assembly includes a cap plate sealing the case and having a short circuit opening; a first short circuit plate installed at the short circuit opening of the cap plate; a second short circuit plate on an exterior of the cap plate and spaced from the cap plate to cover the short circuit opening; and a sealing layer between the second short circuit plate and the cap plate.

In one embodiment, the sealing layer generally corresponds to the second short circuit plate, and has an opening generally corresponding to the short circuit opening. Further, the sealing layer may extend along an edge of the second short circuit plate or along a periphery of the short circuit opening. In one embodiment, the sealing layer is an O-ring.

Further, in one embodiment, the cap plate may include a sealing receiving recess that generally corresponds to an edge of the second short circuit plate or a periphery of the short circuit opening, and wherein at least a portion of the sealing layer is fitted into the sealing receiving recess. The sealing layer may include an adhesive or rubber. Further, an insulating member may be located between the sealing layer and the second short circuit plate and the first short circuit plate may include a reversible plate that includes a convex portion and an edge part fixed to the cap plate.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain principles of the present disclosure. In the drawings.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

Hereinafter, embodiments will be described in detail with reference to the accompanying drawings.

Figure 1:
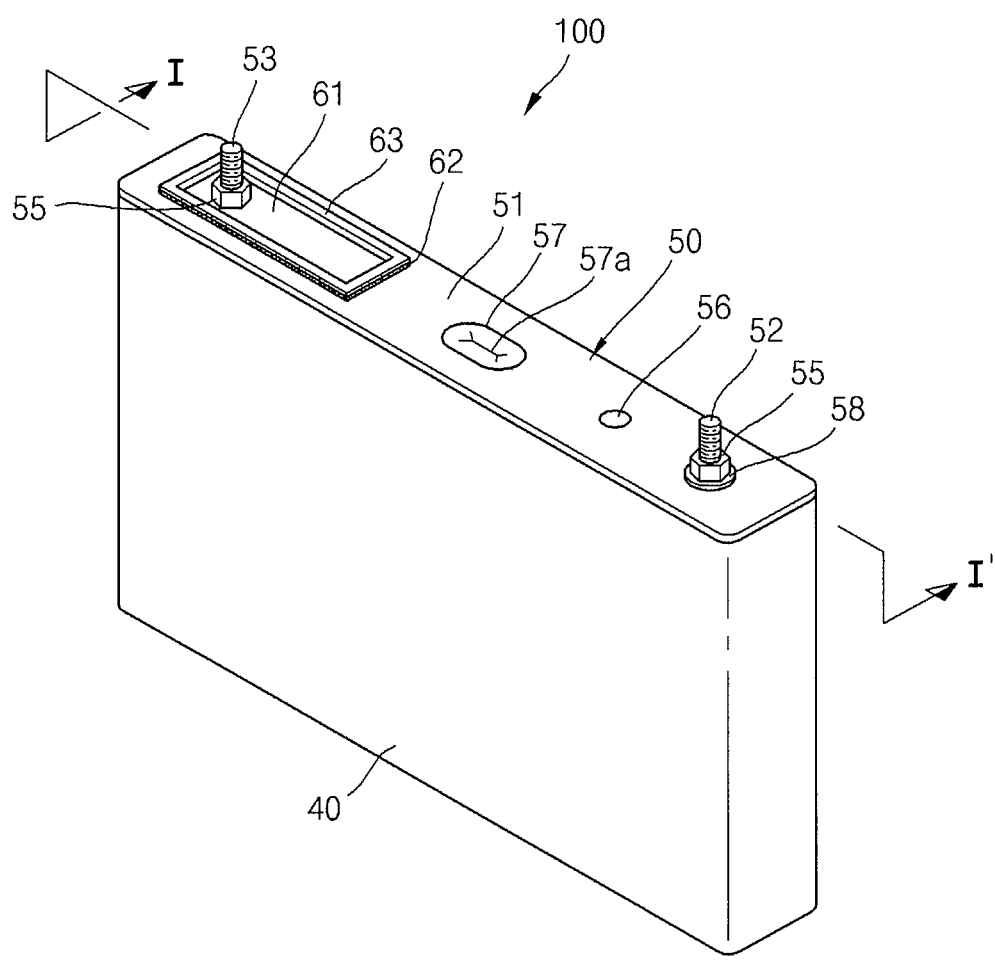
FIG. 1 is a perspective view illustrating a rechargeable battery according to an embodiment.
Figure 2:
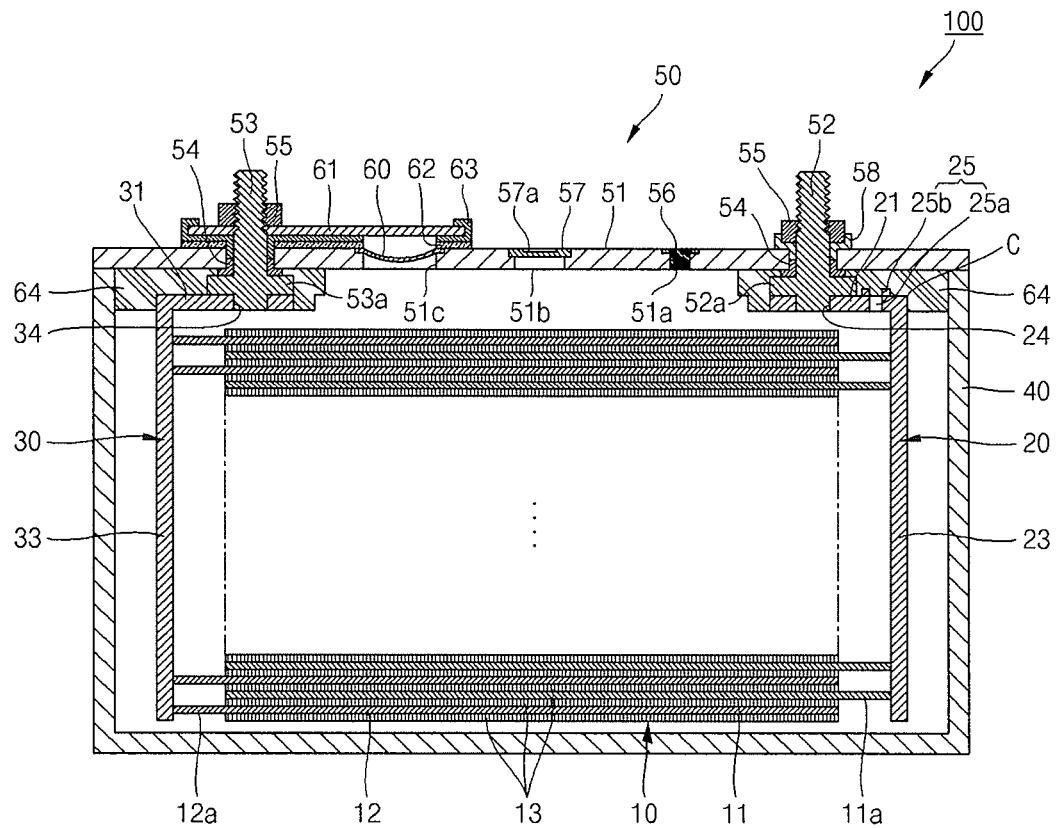
FIG. 2 is a cross-sectional view taken along line I-I' of FIG. 1.
Figure 3A:
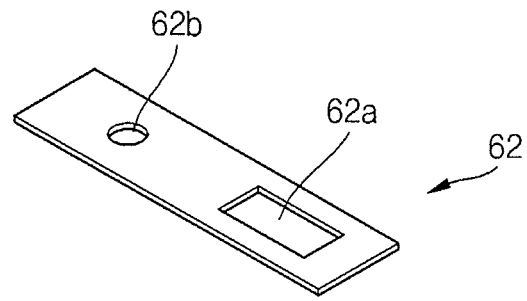
FIG. 3A is a perspective view illustrating a sealing layer of FIG. 2A.
Figure 3B:
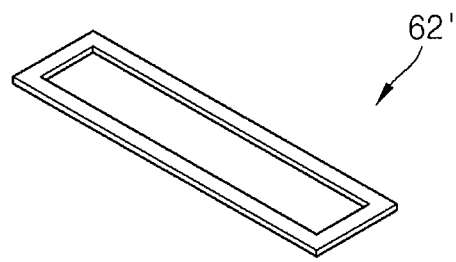
FIG. 3B is a perspective view illustrating another example of the sealing layer of FIG. 3A.
Figure 3C:
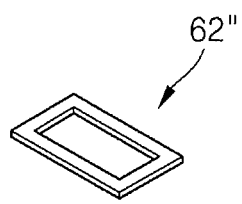
FIG. 3C is a perspective view illustrating another example of the sealing layer of FIG. 3A.

FIG. 1 is a perspective view illustrating a rechargeable battery according to an embodiment. FIG. 2 is a cross-sectional view taken along line I-I' of FIG. 1. FIG. 3A is a perspective view illustrating a sealing layer of FIG. 2A. FIG. 3B is a perspective view illustrating another example of the sealing layer of FIG. 3A. FIG. 3C is a perspective view illustrating another example of the sealing layer of FIG. 3A.

Referring to FIGS. 1 and 2, a rechargeable battery 100 according to the current embodiment includes an electrode assembly 10, a first collecting plate 20, a second collecting plate 30, a case 40, and a cap assembly 50.

The electrode assembly 10 is formed by winding or stacking a first electrode plate 11, a separator 13, and a second electrode plate 12, which have thin plate shapes or film shapes. The first electrode plate 11 may function as a positive electrode, and the second electrode plate 12 may function as a negative electrode.

The first electrode plate 11 is formed by applying first electrode active materials such as transition metal oxide on a first electrode collector formed of metal foil such as aluminum foil, and includes first electrode non-coating portions 11a on which the first electrode active materials are not applied. The first electrode non-coating portions 11a function as passages for current flows between the first electrode plate 11 and the outside of the first electrode plate 11. The material of the first electrode plate 11 is not limited to the materials described by the present disclosure.

The second electrode plate 12 is formed by applying second electrode active materials such as graphite or carbon on a second electrode collector formed of metal foil such as nickel or copper foil, and includes second electrode non-coating portions 12a on which the second electrode active materials are not applied. The second electrode non-coating portions 12a function as passages through which a current flows between the second electrode plate 12 and the outside of the second electrode plate 12. The material of the second electrode plate 12 is not limited to those described by the present disclosure.

The polarity of the first electrode plate 11 and the polarity of the second electrode plate 12 may be interchanged with each other.

The separator 13 is located between the first electrode plate 11 and the second electrode plate 12 to prevent a short circuit and to allow lithium ions to move, and is formed as a film of one of polyethylene, polypropylene, or a combination thereof. However, the material of the separator 13 is not limited to those disclosed by the present disclosure.

Both ends of the electrode assembly 10 are connected with the first collecting plate 20 and the second collecting plate 30 that are respectively connected to the first electrode plate 11 and the second electrode plate 12.

The first collecting plate 20 is formed of a conductive material such as aluminum, and is in contact with the first electrode non-coating portions 11a protruding from one end of the electrode assembly 10, so that the first collecting plate 20 is electrically coupled to the first electrode plate 11. Referring to FIG. 2, the first collecting plate 20 may include a first connection part 21, a first extension part 23, a first terminal hole 24, and a first fuse part 25.

The first connection part 21 is installed between the upper part of the electrode assembly 10 and the lower part of the cap assembly 50, and is formed in a plate shape.

The first extension part 23 is bent from and extends from an end of the first connection part 21, and is formed in a plate shape that is substantially in contact with the first electrode non-coating portions 11a. A corner where the first connection part 21 meets the first extension part 23 is denoted by 'C', and the first connection part 21 may be substantially perpendicular to the first extension part 23 at the corner C.

The first terminal hole 24 is located at a side of the first connection part 21, and provides the first connection part 21 with a space which accommodates a first electrode terminal 52 of the cap assembly 50. The first terminal hole 24 is located at a portion of the first connection part 21, which is spaced from the corner C.

The first fuse part 25 is located at the upper side of the electrode assembly 10, and more specifically, on the first connection part 21 such that the first fuse part 25 does not contact electrolyte. In addition, the first fuse part 25 is located in a region of the first connection part 21 adjacent to the corner C such that the first fuse part 25 does not overlap the first electrode terminal 52 coupled to the first terminal hole 24. The first fuse part 25 includes a first fuse hole 25a and a first reinforcement protrusion 25b protruding from a periphery of the first fuse hole 25a. When a short circuit occurs in the rechargeable battery 100, a large current flows in the rechargeable battery 100. Accordingly, heat is generated to melt the region where the first fuse hole 25a is located so that the first fuse hole 25a functions as a fuse configured to shut off a current flow. Before a short circuit occurs in the rechargeable battery 100, the first reinforcement protrusion 25b strengthens the region of the first fuse hole 25a against external shock.

The second collecting plate 30 is formed of a conductive material such as nickel, and is in contact with the second electrode non-coating portions 12a protruding from another end of the electrode assembly 10 so that the second collecting plate 30 is electrically coupled to the second electrode plate 12. The second collecting plate 30 may include a second connection part 31, a second extension part 33, and a second terminal hole 34.

Since the second connection part 31, the second extension part 33, and the second terminal hole 34 of the second collecting plate 30 are substantially the same in shape and function as the first connection part 21, the first extension part 23, and the first terminal hole 24 of the first collecting plate 20 as illustrated in FIG. 2, descriptions thereof will be omitted.

The case 40 is formed of conductive metal such as steel plated with aluminum, aluminum alloy, or nickel, and has an approximately hexahedron shape provided with an opening part through which the electrode assembly 10, the first collecting plate 20, and the second collecting plate 30 can be inserted and placed. Since FIG. 2 illustrates the case 40 coupled to the cap assembly 50, the opening part is not shown, but the edge of the case 40 corresponding to the cap assembly 50 is substantially open. The inner surface of the case 40 is electrically insulated from the electrode assembly 10, the first collecting plate 20, the second collecting plate 30, and the cap assembly 50. In this case, the case 40 may function as a pole, e.g., a positive pole.

The cap assembly 50 is coupled to the case 40. In detail, the cap assembly 50 may include a cap plate 51, the first electrode terminal 52, the second electrode terminal 53, gaskets 54, and nuts 55. The cap assembly 50 may further include a cap 56, a vent plate 57, a connection plate 58, a first short circuit plate 60, a second short circuit plate 61, a sealing layer 62, an upper insulating member 63, and lower insulating members 64.

The cap plate 51 seals an opening of the case 40, and may be formed from the same material as the case 40. The cap plate 51 may include an electrolyte injection hole 51a, a vent hole 51b, and a short circuit opening 51c. The cap plate 51 may have the same polarity as that of the case 40.

The first electrode terminal 52 passes through a side of the cap plate 51, and is electrically coupled to the first collecting plate 20. The first electrode terminal 52 may have a column shape. The outer circumferential edge of an upper portion of the column shape exposed to the upper side of the cap plate 51 is provided with a screw thread. The lower portion of the column shape located at the lower side of the cap plate 51 has a flange 52a to prevent the first electrode terminal 52 from being separated from the cap plate 51. A portion of the column shape of the first electrode terminal 52 at the lower side of the flange 52a is fitted into the first terminal hole 24 of the first collecting plate 20. The first electrode terminal 52 may be electrically coupled to the cap plate 51.

The second electrode terminal 53 passes through another side of the cap plate 51, and is electrically coupled to the second collecting plate 30. Since the second electrode terminal 53 has substantially the same shape as the first electrode terminal 52, including a flange 53a, a description thereof will be omitted. Additionally, the second electrode terminal 53 is electrically insulated from the cap plate 51.

The gasket 54 is formed of an insulating material and located between the cap plate 51 and both the first and second electrode terminals 52,53 to seal the space between the cap plate 51 and the first and second electrode terminals 52, 53. The gaskets 54 prevent moisture from entering the rechargeable battery 100 and prevent electrolyte stored in the rechargeable battery 100 from leaking to the outside.

The nuts 55 are coupled along the screw threads provided respectively to the first electrode terminal 52 and the second electrode terminal 53, so as to respectively fix the first electrode terminal 52 and the second electrode terminal 53 to the cap plate 51.

The cap 56 seals the electrolyte injection hole 51a of the cap plate 51. The vent plate 57 is installed in the vent hole 51b of the cap plate 51, and includes a notch 57a to be opened at a set pressure.

The connection plate 58 is configured such that the first electrode terminal 52 is fitted between the first electrode terminal 52 and the cap plate 51, and contacts the cap plate 51 and the gasket 54 through the nut 55. The connection plate 58 electrically couples the first electrode terminal 52 to the cap plate 51.

The first short circuit plate 60 is installed in the short circuit opening 51c of the cap plate 51. The first short circuit plate 60 may be formed as a reversible plate that includes a round convex part protruding toward an interior of the case 40 and an edge part fixed to the cap plate 51. When an inner pressure of the rechargeable battery 100 is greater than a set pressure, the first short circuit plate 60 is reversed such that the convex part protrudes away from an interior of the case 40. The first short circuit plate 60 has the same polarity as that of the cap plate 51.

The second short circuit plate 61 is located on an exterior of the case 40 and is spaced from the cap plate 51, and the second electrode terminal 53 is fitted into the second short circuit plate 61. The second short circuit plate 61 extends to cover the short circuit opening 51c. The second short circuit plate 61 is electrically coupled to the second electrode terminal 53. When the rechargeable battery 100 is overcharged, and an inner pressure is greater than a set pressure, the second short circuit plate 61 contacts the first short circuit plate 60 that is reversed to protrude away from the interior of the case 40 and causes a short circuit. When the short circuit occurs, a large current flows, and heat is generated. At this point, the first fuse part 25 functions as a fuse through the first fuse hole 25a, thereby improving the stability of the rechargeable battery 100.

The sealing layer 62 is located between the second short circuit plate 61 and the cap plate 51. Referring to FIG. 3A, the sealing layer 62 may include a first opening 62a in a region generally corresponding to the short circuit opening 51c, and a second opening 62b in a region generally corresponding to the second electrode terminal 53. The sealing layer 62 seals the space between the second short circuit plate 61 and the cap plate 51 to prevent condensed water from an exterior of the case 40 from entering the case between the second short circuit plate 61 and the cap plate 51 and being collected on the first short circuit plate 60. Accordingly, the sealing layer 62 prevents the first short circuit plate 60 from being electrically coupled to the second short circuit plate 61 to form a short circuit, thus reducing degradation and capacity decrease of the rechargeable battery 100 and preventing corrosion of inner components of the rechargeable battery 100 due to condensed water. The sealing layer 62 may be formed of adhesive or rubber that improves sealing efficiency and is insulating, but the material of the sealing layer 62 is not limited to those disclosed within the present disclosure. A short circuit formed by the first short circuit plate 60 electrically coupled through condensed water to the second short circuit plate 61 may be a small short circuit through which a small current flows.

In FIG. 3A, the sealing layer 62 has a size generally corresponding to the second short circuit plate 61. However, to reduce the amount of material used to constitute the sealing layer 62, a sealing layer 62' may be located along the edge of the second short circuit plate 61 as illustrated in FIG. 3B, or a sealing layer 62" may generally surround the short circuit opening 51c as illustrated in FIG. 3C.

The upper insulating member 63 is configured such that it is fitted between the second electrode terminal 53 and the cap plate 51, and contacts the cap plate 51 and the gasket 54. In addition, the upper insulating member 63 is located between the second short circuit plate 61 and the sealing layer 62, and has an opening in a region generally corresponding to the short circuit opening 51c. The upper insulating member 63 insulates the second electrode terminal 53 and the cap plate 51, and supports the second short circuit plate 61.

The lower insulating member 64 is located between the cap plate 51 and both the first and second collecting plates 20, 30 to prevent an unnecessary short circuit.

As described above, the rechargeable battery 100 includes the sealing layer 62 between the cap plate 51 and the second short circuit plate 61 to prevent condensed water introduced from the outside from being collected in the first short circuit plate 60.

Thus, the rechargeable battery 100 prevents or reduces a likelihood of a short circuit between the first short circuit plate 60 and the second short circuit plate 61 due to condensed water, and thus, prevents degradation and capacity decrease, and prevents corrosion of inner components due to condensed water.

Hereinafter, a rechargeable battery will now be described according to another embodiment.

Figure 4:
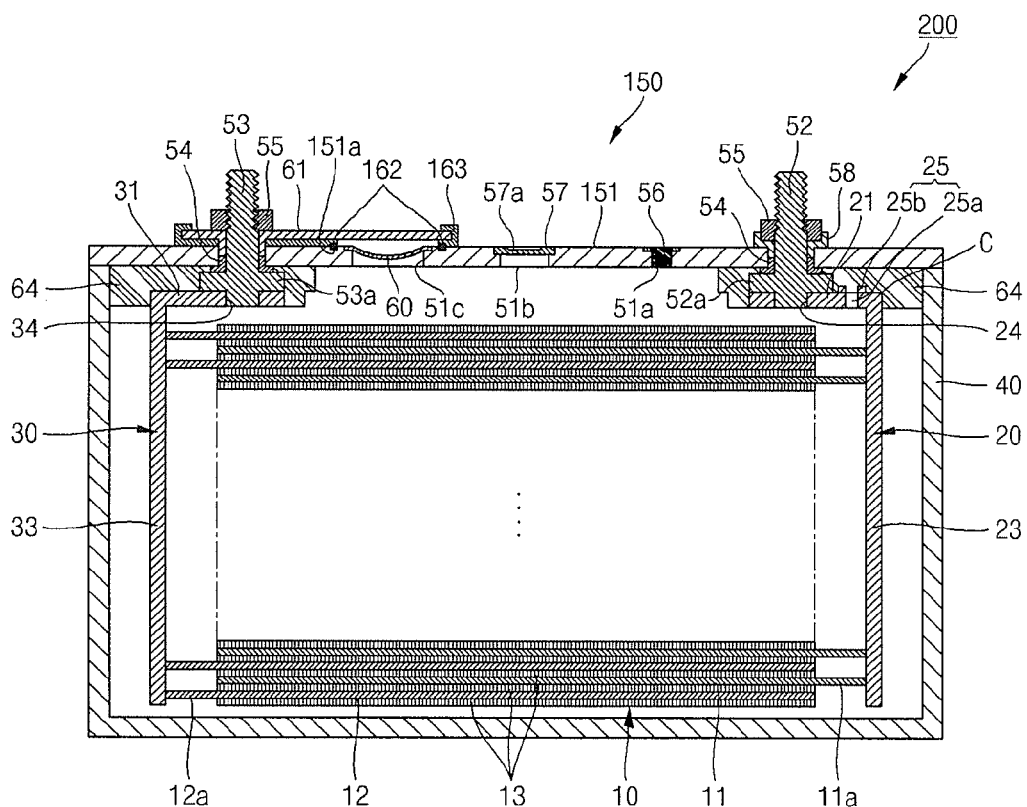
FIG. 4 is a perspective view illustrating a rechargeable battery according to another embodiment.
Figure 5:
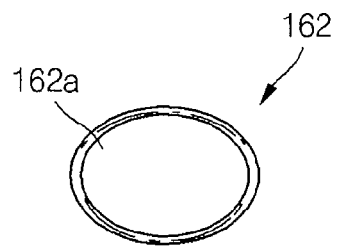
FIG. 5 is a perspective view illustrating a sealing layer of FIG. 4.

FIG. 4 is a perspective view illustrating a rechargeable battery according to the current embodiment, and FIG. 5 is a perspective view illustrating a sealing layer of FIG. 4.

A rechargeable battery 200 according to the current embodiment has generally the same configuration and function as the rechargeable battery 100 illustrated in FIG. 2 except for a configuration of a cap plate 151 of a cap assembly 150, a sealing layer 162, and an upper insulating member 163. Thus, descriptions of components with substantially the same configuration of the rechargeable battery 200 as those of the previous embodiments will be omitted, and the cap plate 151, the sealing layer 162, and the upper insulating member 163 will now be primarily described.

Referring to FIGS. 4 and 5, the rechargeable battery 200 includes the electrode assembly 10, the first collecting plate 20, the second collecting plate 30, the case 40, and the cap assembly 150.

The cap assembly 150 may include the cap plate 151, the first electrode terminal 52, the second electrode terminal 53, the gasket 54, the nut 55, the cap 56, the vent plate 57, the connection plate 58, the first short circuit plate 60, the second short circuit plate 61, the sealing layer 162, the upper insulating member 163, and the lower insulating members 64.

The cap plate 151 is similar to the cap plate 51 illustrated in FIG. 2. However, the cap plate 151 includes a sealing receiving recess 151a for accommodating a portion of the sealing layer 162 around the short circuit opening 51c. The sealing receiving recess 151a increases physical coupling force between the cap plate 151 and the sealing layer 162. The sealing receiving recess 151a may have a circular plane shape.

The sealing layer 162 is located between the second short circuit plate 61 and the cap plate 151, and is coupled to the sealing receiving recess 151a. In detail, the sealing layer 162 may be formed as an O-ring that has an opening 162a in a region generally corresponding to the short circuit opening 51*c*. The sealing layer 162 is more securely coupled to the cap plate 151 through the sealing receiving recess 151*a*, to further improve efficiency in sealing the space between the cap plate 151 and the second short circuit plate 61. In the current embodiment, the sealing layer 162 formed as an O-ring is coupled to the sealing receiving recess 151*a* of the cap plate 151. However, alternatively, adhesive or the sealing layer 62' or 62" formed of rubber may be coupled to the sealing receiving recess 151*a* of the cap plate 151. In this case, the sealing receiving recess 151*a* is located in a region generally corresponding to the edge of the second short circuit plate 61 or in a periphery of the short circuit opening 51*c*.

The upper insulating member 163 is similar to the upper insulating member 63 illustrated in FIG. 2. However, the upper insulating member 163 has a different shape from the upper insulating member 63 due to the sealing layer 162. For example, the upper insulating member 163 is located between the cap plate 151 and the second short circuit plate 61 in the region where the second electrode terminal 53 is located.

As described above, the rechargeable battery 200 includes the sealing layer 162 formed as an O-ring to further improve efficiency in sealing the space between the cap plate 151 and the second short circuit plate 61.

The rechargeable battery according to the current embodiments includes the sealing layer to prevent the entry of condensed water, thereby preventing degradation and capacity decrease caused by a short circuit due to condensed water, and preventing corrosion of inner components due to condensed water.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present disclosure as set forth in the following claims.

What is claimed is:

1. A rechargeable battery comprising:
   an electrode assembly including a first electrode plate, a second electrode plate, and a separator between the first electrode plate and the second electrode plate;
   a case housing the electrode assembly;
   a first electrode terminal electrically connecting the first electrode plate;
   a second electrode terminal electrically connecting the second electrode plate; and
   a cap assembly coupled to the case, wherein the cap assembly comprises:
   a cap plate directly coupled to the case, and physically coupled to the first electrode terminal or the second electrode terminal, and having a short circuit opening;
   a first short circuit plate installed at the short circuit opening of the cap plate;
   a second short circuit plate on an exterior of the cap plate, the second short circuit plate being spaced from the cap plate to cover the short circuit opening and being entirely spaced from the first short circuit plate, wherein at a predetermined pressure, the second short circuit plate is configured to directly contact the first short circuit plate to cause a short circuit; and
   a sealing layer between the second short circuit plate and the cap plate, wherein the cap plate is electrically connected to the case.

2. The rechargeable battery as claimed in claim 1, wherein the sealing layer generally corresponds to the second short circuit plate, and wherein the sealing layer has an opening generally corresponding to the short circuit opening.

3. The rechargeable battery as claimed in claim 1, wherein the sealing layer extends along an edge of the second short circuit plate.

4. The rechargeable battery as claimed in claim 1, wherein the sealing layer extends along a periphery of the short circuit opening.

5. The rechargeable battery as claimed in claim 4, wherein the sealing layer comprises an O-ring.

6. The rechargeable battery as claimed in claim 1, wherein the cap plate comprises a sealing receiving recess that generally corresponds to an edge of the second short circuit plate or a periphery of the short circuit opening, and wherein at least a portion of the sealing layer is fitted into the sealing receiving recess.

7. The rechargeable battery as claimed in claim 1, wherein the sealing layer comprises adhesive.

8. The rechargeable battery as claimed in claim 1, wherein the sealing layer comprises rubber.

9. The rechargeable battery as claimed in claim 1, wherein an insulating member is located between the sealing layer and the second short circuit plate.

10. The rechargeable battery as claimed in claim 1, wherein the first short circuit plate comprises a reversible plate that includes a convex portion and an edge part fixed to the cap plate.

11. The rechargeable battery as claimed in claim 1, wherein the first short circuit plate is electrically coupled to the first electrode plate.

12. The rechargeable battery as claimed in claim 1, wherein the second short circuit plate is electrically coupled to the second electrode plate.

* * * * *